United States Patent [19]

Horsch

[11] Patent Number: 4,633,960
[45] Date of Patent: Jan. 6, 1987

[54] CRAWLER TRACK HYDRAULIC TRANSMISSION CONTROL SYSTEM

[75] Inventor: Rudolf Horsch, Davenport, Iowa

[73] Assignee: J. I. Case Company, Racine, Wis.

[21] Appl. No.: 805,868

[22] Filed: Dec. 6, 1985

[51] Int. Cl.[4] .............................................. B62D 11/08
[52] U.S. Cl. ..................................... 180/6.7; 192/13 A
[58] Field of Search ........................... 180/6.2, 6.7, 6.5; 192/13 R, 13 A, 18 A

[56] References Cited

U.S. PATENT DOCUMENTS

| 3,068,976 | 12/1962 | Kelley | 192/13 R |
| 3,899,054 | 8/1975 | Pasquini | 192/13 R |
| 3,907,052 | 9/1975 | Shaw | 192/13 R |
| 4,479,563 | 10/1984 | Horsch | 180/6.7 |

Primary Examiner—John J. Love
Assistant Examiner—Donn McGiehan
Attorney, Agent, or Firm—Dressler, Goldsmith, Shore, Sutker & Milnamow, Ltd.

[57] ABSTRACT

A hydraulic transmission control system is provided for enhancing braking of a crawler-type tractor by controlling the engagement and disengagement of the clutches associated with right-hand and left-hand crawler tracks in response to actuation of the brakes associated with the tracks. The arrangement includes hydraulic pressure sensor means operatively associated with the hydraulic brake systems of the right-hand and left-hand crawler tracks. The system is arranged to selectively function such that actuation of both the right-hand and left-hand track brakes simultaneously prevents the normal disengagement of the track clutches, which permits the engine of the tractor to assist in braking. Actuation of a single brake pedal provides braking of the respective crawler track with disengagement of its respective clutch, while allowing the clutch of the opposite track to remain engaged to effect the pivot turning of the implement.

1 Claim, 2 Drawing Figures

CRAWLER TRACK HYDRAULIC TRANSMISSION CONTROL SYSTEM

FIELD OF THE INVENTION

The invention relates generally to crawler track transmission systems for material handling equipment. More particularly, the invention relates to a hydraulic transmission control system particularly suited for use in crawler-type drive tractors with left-hand and right-hand crawler drive tracks, wherein the control system is selectively operable to provide enhanced engine-braking of the crawler tracks.

BACKGROUND OF THE INVENTION

There are many instances in which enhanced braking capabilities from material handling equipment are desired. Such capabilities are particularly desirable for crawler-type drive tractors with right-hand and left-hand crawler drive tracks. Because such crawler-type drive tractors are used for a variety of material handling functions in areas having restricted space and/or irregular or hilly terrain, effective braking and precise control for manueverabilty are required for efficient operation.

Transmission systems for crawler-type drive tractors known previously have typically included a clutch and a steering brake for each of the crawler tracks. These clutches and steering brakes are selectively and hydraulically actuated through operator-controlled mechanical linkages. The mechanical linkages operate the necessary hydraulic cylinders and valves which effect operation of the track clutches and brakes.

In many crawler-track transmission systems currently in use, hydraulic actuation of the brake for one of the crawler tracks results in disengagement of the clutch for that track. As a result, the track is disconnected from the internal combustion engine of the implement. Clutch disengagement is usually effected hydraulically by providing hydraulic fluid lines which are operatively associated with the brake cylinder for one of the crawler tracks and its respective clutch. Disengagement of the clutch for the track being braked, while the clutch of the other crawler track remains engaged and that track driven, permits the operator of the implement to execute a so-called pivot turn for manuevering the implement.

While many crawler track transmission system operate as described above, it will be appreciated that in some instances, disengagement of the crawler track clutches in connection with application of the track brakes is not desirable. This is particularly true when the crawler implement is being used on hilly or irregular terrain. When used on such terrain, it is frequently desirable to take advantage of the braking effect provided by the implement's internal combustion engine to brake the implement. Of course, this requires that the clutches operatively connecting the crawler tracks with engine remain engaged.

In one known crawler track transmission system, as disclosed in commonly-assigned U.S. Pat. No. 4,479,563, pressure sensors are provided for each of the crawler track brake lines. Each of the pressure sensors generates an electrical signal indicating when the associated brake pedal has been depressed. The electrical signal from each pressure sensor is coupled to an electrically actuated lock valve associated with the clutch for the other crawler track. Actuation of both right-hand and left-hand track brakes simultaneously prevents the normal disengagement of the track clutches. This then permits the engine of the tractor to assist in braking. This known system is a combined electrical-hydraulic system.

While the above-noted, known crawler track transmission system provides the desired function of coupling the crawler tracks with the engine during the time when both brake pedals are simultaneously depressed, it is desirable to provide a control system which is non-electric and which provides the same function. It is also desirable that any such non-electric system not impair normal manueverability of the implement. Depressing only one of the implement brake pedals should still result in normal disengagement of the respective clutch for the track being braked. This will permit the operator of the implement to continue to efficiently execute the pivot turns which are necessary for manuevering the vehicle. In addition, any such hydraulic system should be readily fabricated and installed, and should be straightforward in construction to facilitate reliable operation under the severe operating condition to which material handling implements are typically subjected.

SUMMARY OF THE INVENTION

A transmission control system embodying the present invention offers greatly enhanced braking capability without impairing the normal maneuverability of the implement for efficient operation. This transmission system is particularly suited for use in a crawler-type drive tractor with left-hand and right-hand crawler drive tracks with associated left-hand and right-hand hydraulic brake and clutch assemblies.

In accordance with the present invention, a hydraulic transmission control system usable in such an implement with right and left crawler tracks is provided. Left and right sensor means for sensing differences in hydraulic pressures are operatively coupled between the left and right hydraulic brake lines. An output of the left sensor means is in fluid flow communication with a transmission valve for the left clutch. An output of the right sensor means is in fluid-flow communication with a transmission valve for the right clutch.

When both brake pedals are depressed simultaneously, such as when descending a steep grade, each sensor means is subjected to essentially equal pressure in the left and right hydraulic lines. In this balanced condition, hydraulic fluid is not permitted to flow to either of the clutches via the transmission valve. Hence, neither clutch will disengage, and both normal and engine braking of the crawler tracks is effected.

When one brake pedal, left or right, is depressed, such as during execution of a pivot turn, the respective sensor means is subjected to unequal pressures. As a result, hydraulic fluid flows to the respective transmission valve. The respective clutch then disengages the engine from the track.

The braking capability of the implement is thus increased without detracting from its manueverability. This is accomplished by monitoring the hydraulic line pressures within the hydraulic brake system to control the operation of the crawler track clutches, and is desirably effected without resort to electrical pressure sensors or the like.

In a particular embodiment of the present invention, the sensor means each comprises an axially shiftable, hydraulic spool valve. Each spool valve is associated with a respective one of the track clutches, with opposite ends of each valve acted upon by the fluid pressures in the right and left hydraulic brake lines.

During operation of the present hydraulic transmission control system, implement maneuvering can be effected by depressing either the right or the left brake pedals individually for selective braking of the respective crawler track. Upon actuation of either the right or the left brake pedal, a hydraulic fluid pressure difference will be created between the right and left hydraulic brake lines. This difference will be sensed by the respective one of the spool valves associated with that particular track brake. As a result of such a pressure difference, the spool in the respective valve will shift. Hydraulic fluid is then free to pass through that spool valve into the respective transmission control valve associated with the clutch of the track being braked. That clutch will then be disengaged. Since actuation of either, but not both, of the right or the left brake pedals only disengages the clutch associated with that respective right-hand or left-hand crawler drive track, while allowing the clutch associated with the opposite crawl or drive track to remain engaged, the implement can be manuevered in a normal fashion.

As now will be described, the operative interconnection of each of the right-hand and left-hand track brakes with the respective track clutches of the opposite crawler track provides enhanced braking for the implement. Actuation, simultaneously, of both pedals of the system results in essentially equal pressure in the hydraulic lines of each track brake. As a result, neither spool valve will be subject to a pressure difference and neither will shift. Thus, both track clutches will stay engaged. Since the clutches continue to be connected with the implement's engine, the braking effect provided by the engine can be used to assist the track brakes in slowing the implement.

Provisions are also preferably included for selective activation and deactivation of the engine braking feature of the present transmission system using manually operable shut-off valves. Such valves allow normal operation of a hydraulic brake and clutch systems, without additional engine braking. This is accomplished by closing those valves, thereby permitting disengagement of either the right-hand or left-hand track clutch when either the right or the left brake pedal is actuated, or disengagement of both clutches when both right and left brake pedals are simultaneously actuated.

Numerous other advantages and features of the present invention will become readily apparent from the following detailed description of the invention and the embodiments thereof, from the claims and from the accompanying drawings in which the details of the invention are fully and completely disclosed as a part of this specification.

DESCRIPTION OF THE PREFERRED EMBODIMENTS

Figure 1:
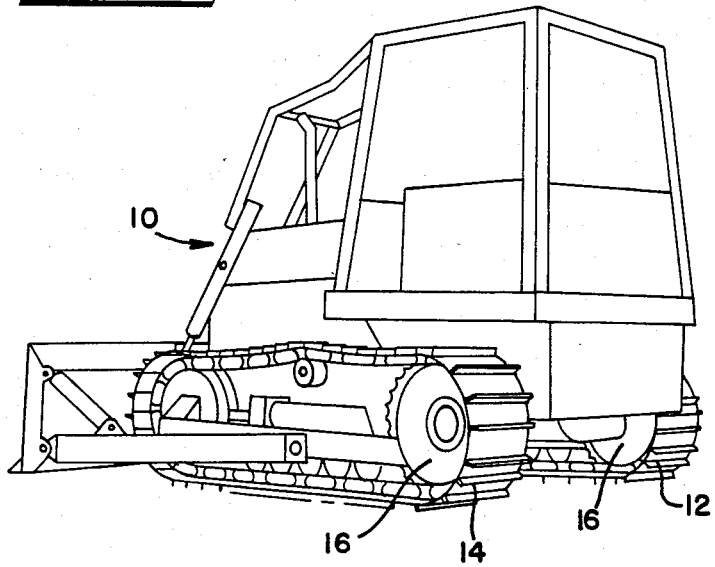
FIG. 1 is a perspective view of a crawler-type drive tractor having left-hand and right-hand crawler or drive tracks.

While this invention is susceptible of embodiment in many different forms, there is shown in the drawings and will be described herein in detail a specific embodiment thereof with the understanding that the present disclosure is to be considered as an exemplification of the principles of the invention and is not intended to limit the invention to the specific embodiment illustrated.

For purposes of the present disclosure, the present transmission control system is described and associated with a material handling implement having independently operable right-hand and left-hand crawler tracks. However, it will be appreciated that the present control system can be readily adapted for implements having other than crawler tracks, such as implements having independently operable right-hand and left-hand drive wheel sets.

FIG. 1 of the drawings discloses a typical crawler-type drive tractor 10 having right-hand and left-hand crawler tracks 12 and 14, respectively. The crawler tracks 12 and 14 are driven by drive sprockets 16.

Figure 2:
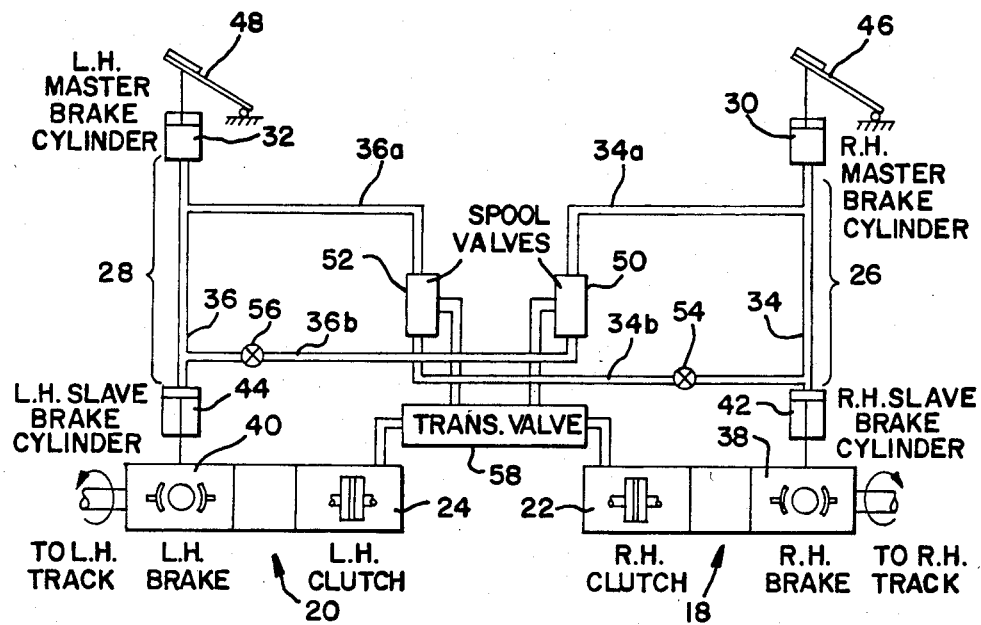
FIG. 2 is a schematic illustration of the hydraulic circuits as well as associated elements of the present hydraulic transmission control system.

The drive sockets 16 are operatively connected with transmission assemblies 18 and 20 (as shown in FIG. 2). The transmission assemblies 18 and 20 are respectively associated with the right-hand and left-hand crawler tracks 12 and 14. The right-hand and left-hand transmission assemblies 18 and 20 respectively include right-hand and left-hand track clutches 22 and 24. Engagement of the right-hand or left-hand clutches 22 or 24 operatively connects an internal combustion engine (not shown) of the crawler tractor 10 to the drive sprockets 16 thereby turning the right-hand and left-hand crawler tracks 12 and 14 for driving the tractor 10.

The right-hand and left-hand crawler tracks 12 and 14 are also associated with right-hand and left-hand brake assemblies, respectively generally designated 26 and 28. These brake assemblies respectively include right-hand and left-hand hydraulic master brake cylinders 30 and 32 connected via right-hand and left-hand hydraulic conduits or lines 34 and 36 to right-hand and left-hand hydraulic slave brake cylinders 42 and 44.

Each of the right-hand and left-hand slave brake cylinders 42 and 44 are respectively, operatively connected to right-hand and left-hand crawler track brakes 38 and 40. Selective track brake actuation is effected by depression of the right-hand or left-hand brake pedals 46 or 48.

Depression of either the brake pedal 46 or the brake pedal 48 produces an increase in the hydraulic fluid pressure in the respective master brake cylinder 30 or 32. Hydraulic pressure generated in the master cylinder 30 or 32 is respectively transmitted through hydraulic lines 34 or 36 to pressurize and operate slave brake cylinders 42 or 44. The slave cylinders 42 or 44 in turn effect braking of crawler tracks 12 or 14 by the track brakes 38 or 40.

In accordance with the present invention, the right-hand and left-hand brake lines 34 and 36 are also in communication with right-hand and left-hand spool valves 50 and 52. Conduit 34a is coupled to a first input of the spool valve 50. Conduit 36a is coupled to a first input of the spool valve 52. Conduit 34b is coupled to a second input of the spool valve 52. Conduit 36b is coupled to a second input of the spool valve 50.

Manually-operable shut-off valves 54 and 56 provide an arrangement for selectively isolating or uncoupling conduit 34b from conduit 34, and for uncoupling conduit 36b from conduit 36, respectively. As discussed further subsequently, when the valves 54 and 56 are closed, the implement 10 is operable in a conventional fashion, i.e., actuation of either of the track brakes effects disengagement of the respective track clutch.

The spool valves 50 and 52 are of a conventional variety and are designed to sense a difference in hydraulic pressure applied at the first and second inputs of the respective valve. If there is an imbalance of pressure between the two inputs, the spool shifts position within the valve in response to that difference in pressures thereby opening or closing the valve. Hence, spool valves such as 50 or 52 are mechanical means for sensing a pressure difference between two hydraulic lines and for responding thereto.

The valves 50 and 52 are normally in a closed position thereby blocking the flow of hydraulic fluid from the conduit lines 34a and 36a, respectively into the transmission valve 58. The transmission valve 58 is in operative communication with, and effects engagement or disengagement of the right-hand and left-hand track clutches 22 and 24, respectively.

When the valves 50 and 52 are in a closed position, no fluid flows therethrough into the transmission valve 54. As a result, the respective right-hand/left-hand clutch 22/24 is engaged. In this condition, the tracks 12 and 14 are operatively connected with the implement engine via the implement's transmission, and the implement will move if the engine is running and the transmission is in gear.

Depressing brake pedal 46 or brake pedal 48, but not both, increases pressure in the respective hydraulic line 34a or the hydraulic line 36a. Pressure is also increased in the respective line 34b or 36b (assuming the valves 54 and 56 have been opened).

Assuming the brake pedal 46 has been depressed, pressure is applied, via the conduit 34a to the valve 50. No pressure will be applied via the line 36b since the pedal 48 has not been depressed. The valve 50 will shift due to the presence of hydraulic brake fluid pressure at one input but not at the other input. The valve 50 is then opened and fluid can flow through the conduit 34a into the transmission valve 58. This disengages the right-hand clutch 22.

On the other hand, if both brake pedals 46 and 48 are depressed essentially simultaneously, pressure is applied via the hydraulic conduits 34a and 36b to both inputs of the spool valve 50. Similarly, pressure is applied via the brake line conduits 36a and 34b to both inputs of the spool valve 52. Essentially equal pressures are applied to both inputs of each of the valves 50 and 52.

In this balanced pressure condition, the spools in the valves 50, 52 do not change position to open either of the valves. As a result, no pressurized hydraulic fluid is introduced into the transmission valve 58 and both the right-hand clutch 22 and the left-hand clutch 24 remain engaged. Since the internal combustion engine continues to be coupled to the right-hand and left-hand tracks 12 and 14, respectively, via the engaged clutches 22 and 24, a decrease in the engine's speed contributes to the track braking of the vehicle 10.

In the event that the manually-operable valves 54 and 56 have not been opened, fluid pressure will be applied to the valve 50 only through the conduit 34a, and to the valve 52 only through the conduit 36a. As a result, in this case, depressing the right-hand brake pedal 46 or left-hand brake pedal 48, or both, will impose an unbalanced hydraulic pressure on the respective valves 50, 52, causing the spools therein to shift thereby opening the valves. Hydraulic fluid will flow to the transmission valve 58 and disengage the right-hand clutch 22 and/or the left-hand clutch 24. In this circumstance, the internal combustion engine ceases to be coupled to the tracks 12 and/or 14.

Thus, it can be seen that the transmission hydraulic control system of the present invention selectively provides for continued engagement of the crawler track clutches during simultaneous actuation of the right-hand and left-hand track brakes in order to effect engine braking concurrently with normal track braking. Additionally, when either of the right-hand or left-hand track brakes are actuated individually, the crawler tractor associated with that particular brake will effectively be slowed or stopped while the clutch associated with that track is disengaged. The clutch associated with the opposite crawler tractor will remain engaged, thereby allowing the crawler tractor to execute a pivot turn generally about the braked track in a normal fashion.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A transmission control system for a crawler drive having right-hand and left-hand crawler tracks respectively driven by a transmission assembly having right-hand and left-hand clutch means for selective delivery of power to a respective one of the tracks, and right-hand and left-hand brake means for selective braking of a respective one of the tracks, comprising:
right-hand brake cylinder means selectively operable for generating a first brake fluid pressure and for selectively applying said right-hand brake means in response thereto;
left-hand brake cylinder means selectively operable for generating a second brake fluid pressure and for selectively applying said left-hand brake means in response thereto;
right-hand conduit means associated in fluid communication with said right-hand brake cylinder means;
left-hand conduit means associated in fluid communication with said left-hand brake cylinder means;
right and left, independent, hydraulic spool valve means for sensing a difference in the respectively applied first and second brake fluid pressures, with said right spool valve means operatively coupled in fluid communication between said right-hand and said left-hand conduit means, and with said left spool valve means operatively coupled in fluid communication between said left-hand and said right-hand conduit means, each said spool valve means including movable valve spool means in fluid flow communication with a control input of a respective one of said right-hand and left-hand clutch means, each said clutch means maintaining driving engagement for the respective track in response to said right and left spool valve means both sensing a balance of said brake fluid pressures, with each said valve spool means being movable in response to pressurization of the respective brake cylinder means and a sensed difference in the first and second brake fluid pressures, to thereby cause said respective clutch means to disengage the respective track;

right-hand, manually operable shut-off valve means operably positioned between said left spool valve sensing means and said right-hand conduit means, said right-hand shut-off valve means being positionable to block fluid communication between said left spool valve sensing means and said right-hand conduit means so that operation of said left-hand brake cylinder means results in said second brake fluid pressure being applied to said left-hand spool valve means for supplying fluid pressure therefrom to the control input of the respective left-hand clutch means to effect disengagement thereof; and left-hand, manually operable shut-off valve means operably positioned between said right spool valve sensing means and said left-hand conduit means, said left-hand shut-off valve means being positionable to block fluid communication between said right spool valve sensing means and said left-hand conduit means so that operation of said right-hand brake cylinder means results in said first brake fluid pressure being applied to said right-hand spool valve means for supplying fluid pressure therefrom to the control input of the respective right-hand clutch means to effect disengagement thereof, whereby said system is operable to permit selective engine-braking of said crawler tracks attendant to simultaneous operation of said right-hand and left-hand brake cylinder means.

* * * * *